(12) United States Patent
Sugiura et al.

(10) Patent No.: US 7,283,263 B2
(45) Date of Patent: Oct. 16, 2007

(54) PRINT CONTROL METHOD, A PRINT SERVER, A CLIENT AND A RECORDING MEDIUM IN A NETWORK ENVIRONMENT

(75) Inventors: Takayuki Sugiura, Kato (JP); Koichi Nakanishi, Kato (JP); Kazuya Sakamoto, Kato (JP)

(73) Assignee: Fuji Xerox Co., Ltd., Tokyo (JP)

( * ) Notice: Subject to any disclaimer, the term of this patent is extended or adjusted under 35 U.S.C. 154(b) by 694 days.

(21) Appl. No.: 09/828,841

(22) Filed: Apr. 10, 2001

(65) Prior Publication Data

US 2002/0080391 A1    Jun. 27, 2002

(30) Foreign Application Priority Data

Dec. 13, 2000  (JP)  ............................. 2000-378464

(51) Int. Cl.
*G06F 15/00* (2006.01)
(52) U.S. Cl. .................................... 358/1.15
(58) Field of Classification Search ............... 358/1.15, 358/1.14, 1.9, 442, 1.16, 402; 709/208; 399/8, 399/81; 707/1, 104.1; 271/279, 298; 379/268, 379/269; 400/76, 702.1; 705/2
See application file for complete search history.

(56) References Cited

U.S. PATENT DOCUMENTS 6,157,950 A * 12/2000 Krishnan ..................... 709/223
6,327,045 B1 * 12/2001 Teng et al. ................. 358/1.15

6,453,127 B2 * 9/2002 Wood et al. ................. 399/8
(Continued)

FOREIGN PATENT DOCUMENTS

| DE | 100 00 589 A1 | 11/2000 |
| DE | 199 22 118 A1 | 11/2000 |
| DE | 19922118 A1 | 11/2000 |
| JP | 11-53139 | 2/1999 |
| JP | 2000-10753 | 1/2000 |
| JP | 2000-330734 | 11/2000 |

OTHER PUBLICATIONS

Redaktion, Herausgeber u., et al. "Das Druckerbuch", Technik und Technologien der OPS—Hochleistungsdrucker, Drucktechnologien, Oct. 1999, pp. 12-1 through 12-17.
Redaktion, Herausgeber u., et al. "Das Druckerbuch" Technik und Technologien der OPS-Hochleistungsdrucker, Drucktechnologien, pp. 12-4, 12-7, 12-9 and 12-14, Oct. 1999.

(Continued)

*Primary Examiner*—King Y. Poon
*Assistant Examiner*—Saeid Ebrahimi
(74) *Attorney, Agent, or Firm*—Staas & Halsey LLP

(57) ABSTRACT

A print control method in a network environment is provided in which a computer of a LAN transmits print data to a printer of another LAN via the Internet. On the Internet, a terminal device transmits print data to a print server managing a printer so as to use the printer for printing. As a communication protocol between the terminal device and the print server, HTTP is used. In the terminal device, a header including information about the printer to be used is added to the print data, which are transmitted. In the print server, the print data are received, and the print data are transmitted to the printer in accordance with the header of the print data. In the printer, the print data are printed.

2 Claims, 13 Drawing Sheets

U.S. PATENT DOCUMENTS

| | | | |
|---|---|---|---|
| 6,476,938 B1 * | 11/2002 | Soga | 358/442 |
| 6,529,286 B1 * | 3/2003 | King | 358/1.14 |
| 6,738,841 B1 * | 5/2004 | Wolff | 710/62 |
| 6,862,103 B1 * | 3/2005 | Miura et al. | 358/1.15 |
| 7,003,667 B1 * | 2/2006 | Slick et al. | 713/182 |

OTHER PUBLICATIONS

Japanese Office Action Issued with respect to Japanese Application No. 2000-378464, which corresponds to the above-referenced application.

* cited by examiner

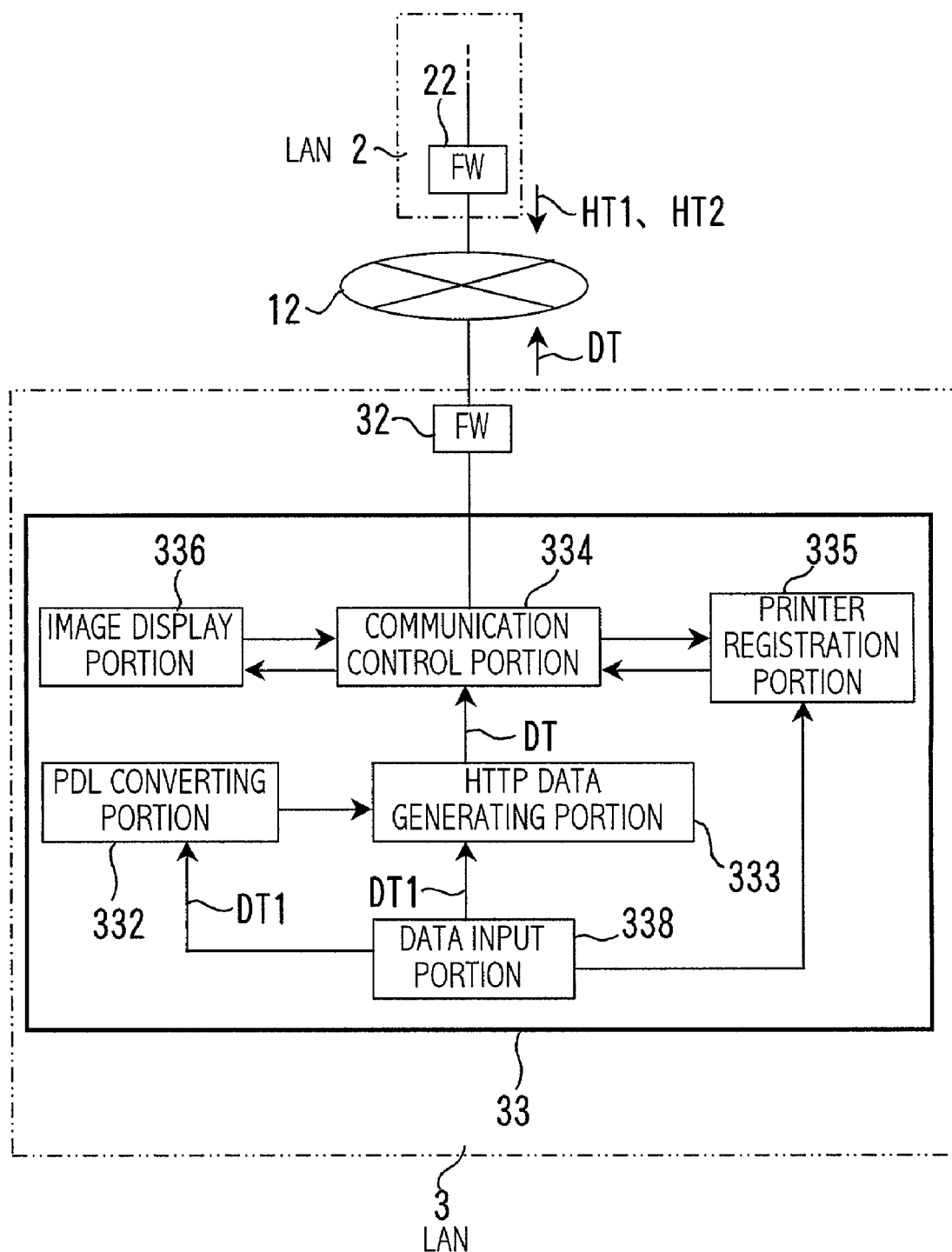

Fig. 4

OUTPUT TARGET PRINTER REGISTRATION — PTJ

| | |
|---|---|
| PRINTER NAME : | prn4 — FLD1 |
| PROTOCOL TO BE USED : | LPR — FLD2 |
| OUTPUT TARGET : | 1xx.30.1.114 — FLD3 |
| MANUFACTURER : | ***CO.,LTD — FLD4 |
| DEVICE TYPE : | LBP-5aaa — FLD5 |
| VERSION : | v1.001a — FLD6 |
| PLACE TO BE INSTALLED : | 1xx.30.1.101 — FLD7 |

[REGISTRATION] BN1  [DELETE] BN2  [EDIT] BN3

WN1

REGISTERED PRINTER LIST

| PRINTER NAME | ADDRESS (PROTOCOL) |
|---|---|
| prn1 | 1xx.30.1.111(LPR) |
| prn2 | yyyyy.com/ipp(IPP) |
| prn3 | printer01(SMB) |
| FLD1 | FLD2  FLD3 |

[OK]  [CANCEL]

REGISTRATION OF PRINTER

ADDRESS: yyyyy.com/print.cgi

WN4   FLD8   BN4 — REGISTRATION

BN5 — PROPERTY

DELETE

OK   CANCEL

PRINTER LIST

| PRINTER NAME | ADDRESS(PROTOCOL) |
|---|---|
| prn1 | 1xx.30.1.111(LPR) |
| prn2 | yyyyy.com/ipp(IPP) |
| prn3 | printer01(SMB) |

NOTICE OF PRINT RESULT
Wed, 20 Sep 2000 13:10:30 +0900

PRINT RESULT IS AS FOLLOWS:

PRINT RESULT : NORMAL
TERMINAL DEVICE TO BE USED : 1yy.55.1.220
PRINTER TO BE USED : 1xx.30.1.11
PRINT OBJECT : report20.doc
TRANSMISSION TIME : Wed, 20 Sep 2000 13:00:30 +0900
PRINT START TIME : Wed, 20 Sep 2000 13:08:30 +0900
PRINT FINISH TIME : Wed, 20 Sep 2000 13:09:15 +0900

HG4

PRINT CONTROL METHOD, A PRINT SERVER, A CLIENT AND A RECORDING MEDIUM IN A NETWORK ENVIRONMENT

BACKGROUND OF THE INVENTION

1. Field of the Invention

The present invention relates to a print control method, a print server, a client and a recording medium in a network environment.

2. Description of the Prior Art

Conventionally, in a small network, one printer is shared by plural computers. For example, a print server is provided in the network for managing print jobs when the computers transmit print data to the print server.

In the case of the small network, a simple communication protocol can be used for establishing a network easily. Therefore, the sharing of a printer can be realized easily.

However, such a simple communication protocol is not all-purpose one and is not suitable for a large-scale network. For example, if plural LANs are connected with each other via routers, it is difficult to transmit data from a LAN to another LAN.

Therefore, a communication protocol such as TCP/IP is used for establishing a large-scale network, e.g., the Internet. The usage of the TCP/IP enables a LAN to be connected with the Internet.

In addition, various communication protocols upper than the TCP/IP, i.e., HTTP (HyperText Transfer Protocol), FTP, Telnet, SMTP or POP3 can be used for receiving various services, which include acquisition of Web contents on the Internet, transmission of files between computers, remote operation of other computers after logging on and transmission or reception of electronic mails.

However, there are an infinite number of computers on the Internet, and an unlimited number of users utilize the services on the Internet. Therefore, a firewall is usually provided between the LAN and the Internet for controlling accesses from computers belonging to other LANs.

By using a firewall, it is possible to control data passing through the firewall for each communication protocol and to prevent the data from passing through the firewall if the data are transmitted by a predetermined communication protocol. For example, an access using Telnet from a computer on the Internet to a computer belonging to the LAN can be prohibited, while data communication using the HTTP can be permitted by setting the access control.

In this way, a firewall can ensure the security of a LAN.

However, a firewall disables the "Internet printing" in which a computer on the Internet transmits print data to a printer belonging to a LAN so as to have the data printed by the printer. Namely, the firewall refuses that the print data enter the LAN.

SUMMARY OF THE INVENTION

An object of the present invention is to provide a print control method, a print server, a client and a recording medium in a network environment such as the Internet, in which print data can be transmitted from a computer belonging to a LAN to a printer belonging to another LAN via the Internet so that the data are printed by the printer.

According to one embodiment of the present invention, a print control method in a network environment is a method of transmitting print data from a client to a print server managing a printer so as to print by the printer. The method comprises the steps of using HTTP as a communication protocol between the client and the print server, adding a header including information about the printer to be used to the print data so as to transmit the print data in the client, receiving the print data and transmitting the print data to the printer in accordance with the header of the print data in the print server, and printing the print data in the printer.

In another embodiment, a print control method for printing by a printer managed by a print server in a network environment comprises the steps of adding a header including information about the printer to be used to print data, receiving the print data from a client requesting for print using HTTP as a communication protocol and transmitting the print data to the printer in accordance with the header of the print data in the print server, and printing the print data in the printer.

In a preferred embodiment, the transmitting step includes the step of removing the header of the print data in the print server before transmitting the print data to the printer.

In another embodiment, the print control method further comprises the steps of monitoring the state of the printer and generating a hypertext describing the state of the printer in the print server.

In another embodiment, the print control method further comprises the steps of memorizing printer information such as an address, a type and a protocol of the printer for each printer and generating a hypertext describing the printer information in the print server.

In another embodiment, the print control method further comprises the steps of memorizing the printer information in the printer and acquiring the printer information using SNMP as a communication protocol so as to monitor the state of the printer in the print server.

According to an aspect of the present invention, a print server manages a printer in a network environment. The print server comprises HTTP receiving means for receiving print data using HTTP as a communication protocol and print data transmitting means for transmitting the print data to a printer as an output target in accordance with a HTTP header of the print data.

Preferably, the print server further comprises printer monitoring means for monitoring the state of the printer, printer information managing means for managing printer information such as an address of the printer, a type of a device and a communication protocol, printer information memorizing means for memorizing the printer information for each printer, first hypertext generating means for generating a hypertext describing the state of the printer, and second hypertext generating means for generating a hypertext describing the printer information. The print data transmitting means remove the header of the print data before transmitting the print data to the printer.

According to an aspect of the present invention, a client comprises printer registering means for registering and managing printer information acquired from a print server managing a printer, the printer information including an address of the printer, a type of the printer and a communication protocol, display means for displaying the printer information on a display screen, selecting means for selecting the printer to be used from the printer registering means, and HTTP transmitting means for adding a header including information about an address of the printer selected by the selecting means to print data and for transmitting the print data to the print server.

According to an aspect of the present invention, a recording medium is a medium that can be read by a computer having a WWW server function. The recording medium stores a program comprising the steps of using HTTP as a communication protocol so as to receive print data from a client and transmitting the print data to a printer designated by the client.

According to an aspect of the present invention, a print control system in a network environment comprises a HTTP server for receiving data using HTTP as a communication protocol and a print server for managing a printer. The print server includes means for memorizing printer information such as an address, a type and a protocol of the printer, means for generating hypertext describing the printer information, and means for transmitting the hypertext to a client. The HTTP server includes means for receiving print data from the client, the print data including a HTTP header designating a printer to be used in accordance with the printer information, and means for transmitting the print data to a printer designated by the HTTP header.

BRIEF DESCRIPTION OF THE DRAWINGS

FIG. 3 is a block diagram showing a functional structure of a terminal device.

FIG. 4 is a diagram showing an example of the printer registration screen in the print server.

FIG. 6 is a diagram showing an example of the printer registration screen in the terminal device.

FIG. 10 is a diagram showing an example of a result report screen.

DESCRIPTION OF THE PREFERRED EMBODIMENTS

Hereinafter, the present invention will be explained more in detail with reference to embodiments and drawings.

Figure 1:
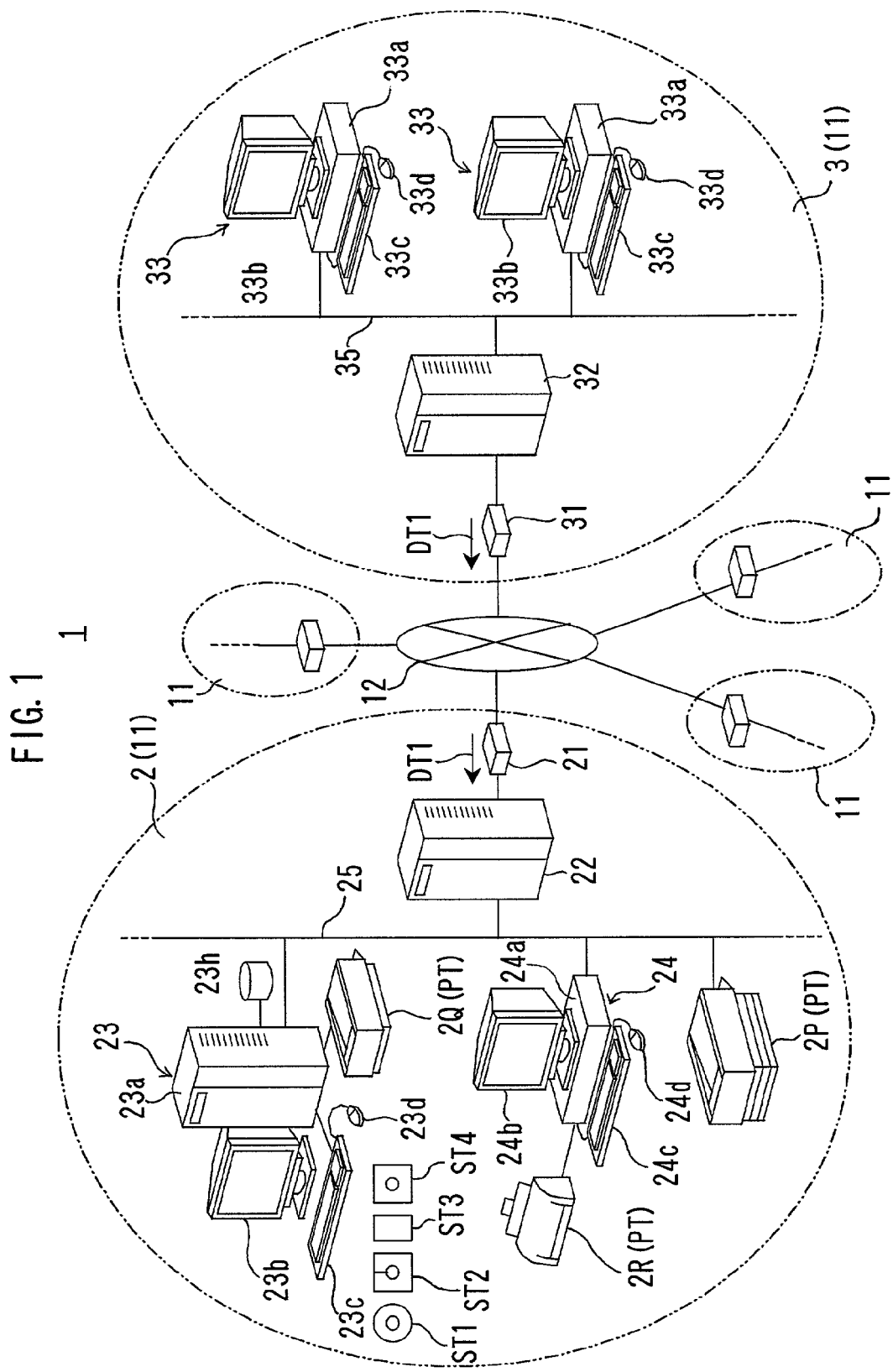
FIG. 1 is a diagram for explaining the Internet and a LAN.
Figure 2:
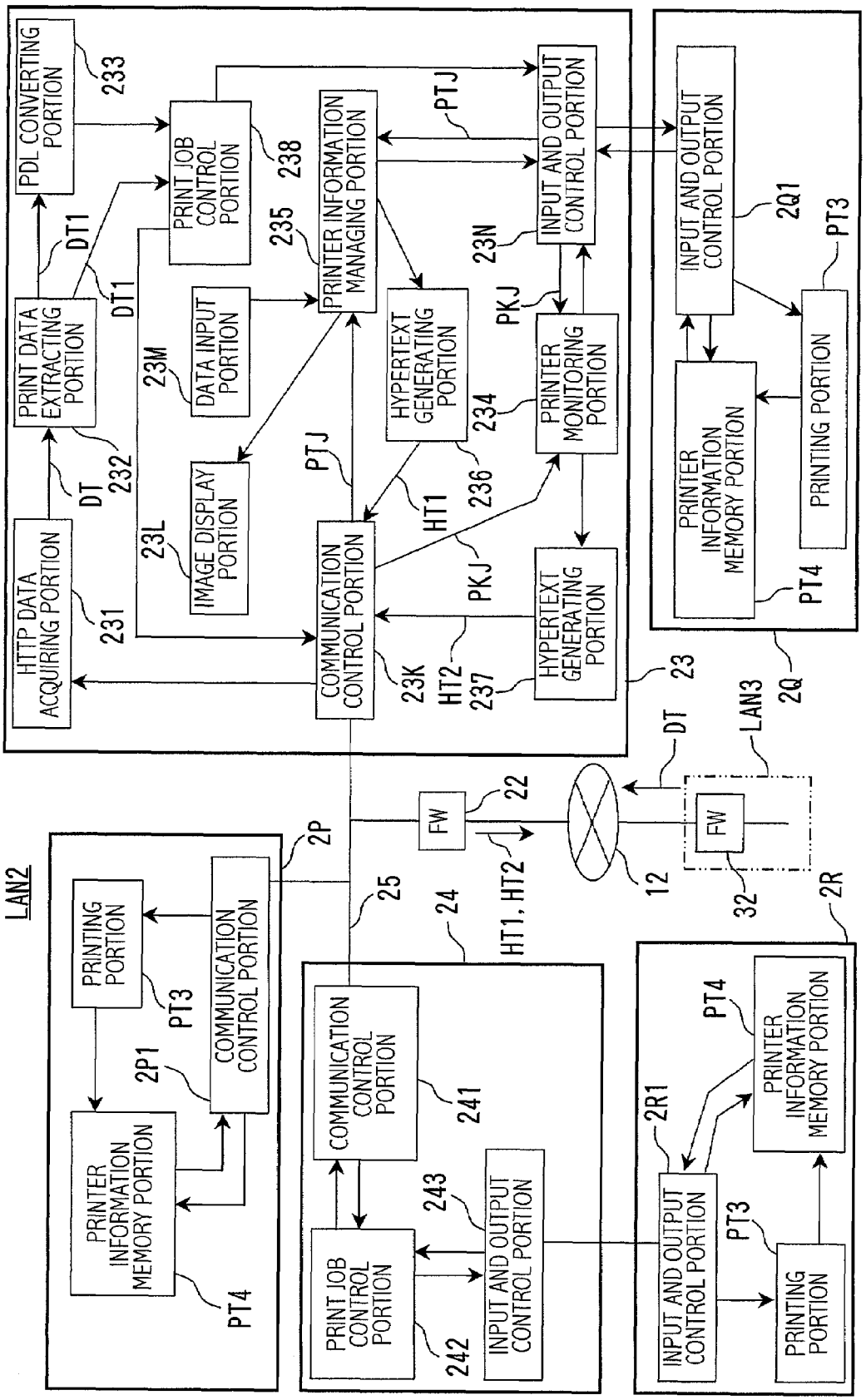
FIG. 2 is a block diagram showing a functional structure of a print server, printers and a computer.

FIG. 1 is a diagram for explaining the Internet 1, a LAN 2 and a LAN 3. FIG. 2 is a block diagram showing a functional structure of a print server 23, printers 2P, 2Q and 2R, and a computer 24. FIG. 3 is a block diagram showing a functional structure of a terminal device 33.

In this embodiment, as shown in FIG. 1, the terminal device 33 belonging to the LAN 3 transmits print data DT1 to the print server 23 belonging to the LAN 2, so that the printers 2P, 2Q or 2R perform the printing job.

As shown in FIG. 1, the Internet 1 is realized by connecting many networks 11 such as a LAN or a WAN via a communication line 12 and by using TCP/IP as a communication protocol. In addition, HTTP, FTP and Telnet are used as upper protocols of the TCP/IP for providing services such as a WWW, a file transmission or a remote login.

The LAN 2 and the LAN 3 as networks 11 are provided with routers 21 and 31 and firewalls 22 and 32, respectively.

Each of the routers 21 and 31 relays communication between the LAN 2 or the LAN 3 and another network 11.

The firewalls 22 and 32 control the security of the LAN 2 and the LAN 3, respectively, by monitoring communication between the LAN 2 or the LAN 3 and another network 11, or by restricting the communication in accordance with such an IP address or a port number of the TCP/IP.

In this embodiment, it is supposed that firewalls 22 and 32 are not set about restriction of communication using the HTTP and are set about a certain restriction of communication using other communication protocols. In this way, it is normal that a firewall is not set about the restriction of communication using the HTTP so that any user can access Web contents.

The LAN 2 comprises the router 21, the firewall 22, the printer 2P, the print server 23 and the computer 24, which are connected to each other via a communication line 25. In addition, the print server 23 and the computer 24 are connected to the printers 2Q and 2R, respectively. As a communication protocol in the LAN 2, SNMP (Simple Network Management Protocol) is used as a network management protocol. The LAN 2 has a domain name "yyyyy-.com".

The printers 2P, 2Q and 2R comprises a printer engine for printing a sheet of paper, a RAM for memorizing print data DT1, a ROM for storing a program for controlling the printer engine and attribution information of the printer, and other various devices. In addition, the printer 2P includes a communication control device and connected to the print server 23 via the communication line 25. The printers 2Q and 2R have input and output interfaces, so as to be connected with the print server 23 and the computer 24. Hereinafter, a printer belonging to the LAN 2 including the printers 2P, 2Q and 2R may be referred to as "printer PT."

The print server 23 comprises a server body 23a, a display device 23b, a keyboard 23c and a mouse 23d. The print server 23 performs setting, managing and monitoring about the printer PT.

The server body 23a includes a CPU, a RAM, a communication control device, an input and output interface for connecting the printer 2Q, and a magnetic disk drive 23h. The magnetic disk drive 23h stores an operating system, a software program of the print server for managing the printer PT, a software program of the WWW server for delivering Web contents such as a hypertext or executing a CGI (Common Gateway Interface) program, and a program for generating a hypertext in accordance with various information about the printer PT. In addition, a PDL (Page Description Language) filter, which is a program for converting print data DT1 into page description language corresponding to each printer PT, is installed in the magnetic disk drive 23h if necessary.

The computer 24 comprises a computer body 24a, a display device 24b, a keyboard 24c and a mouse 24d.

The computer body 24a includes a CPU and an input and output interface for connecting the printer 2R in the same manner as the server body 23a, and necessary software programs including an operating system are installed in the computer body 24a.

The LAN 3 includes a router 31, a firewall 32 and a terminal device 33, which are connected to each other via a communication line 35.

The terminal device 33 includes a computer body 33a, a display device 33b, a keyboard 33c and a mouse 33d in the same manner as the computer 24. The terminal device 33 transmits print data DT1 to the print server 23 so that the printer PT performs a print job.

The computer body 33a includes a CPU in the same manner as the computer body 24a. An operating system, a WWW browser and various application programs are installed in the computer body 33a. In addition, a PDL filter for the printer PT is installed if necessary.

A personal computer or a workstation can be used as the terminal device 33.

Thus, the print server 23, the printers 2P, 2Q and 2R, and the computer 24 realize the functional structure as shown in FIG. 2, while the terminal device 33 realizes the functional structure as shown in FIG. 3.

As shown in FIG. 2, the print server 23 has functional portions including a HTTP data acquiring portion 231, a print data extracting portion 232, a PDL converting portion 233, a printer monitoring portion 234, a printer information managing portion 235, hypertext generating portions 236 and 237, a print job control portion 238, a communication control portion 23K, an image display portion 23L, a data input portion 23M and an input and output control portion 23N.

The computer 24 has functional portions including a communication control portion 241, a print job control portion 242 and an input and output control portion 243.

Each of the printers 2P, 2Q and 2R has functional portions including a printing portion PT3 and a printer information memory portion PT4. In addition, the printer 2P has a communication control portion 2P1, while the printers 2Q and 2R have input and output control portions 2Q1 and 2R1, respectively.

As shown in FIG. 3, the terminal device 33 has functional portions including a PDL converting portion 332, a HTTP data generating portion 333, a communication control portion 334, a printer registration portion 335, an image display portion 336 and a data input portion 338.

The functional portions mentioned above will be explained by classifying them into process groups as follows.

[Communication Between Devices]

The communication control portion 23K controls transmission and reception of data between the print server 23 and another device performed via such as the communication line 12. The communication control portions 241, 2P1 and 334 work in the same way.

The input and output control portions 23N and 2Q1 control transmission and reception of data between the print server 23 and the printer 2Q. In the same way, the input and output control portions 243 and 2R1 control transmission and reception of data between the computer 24 and the printer 2R.

[User Interface]

The image display portion 23L shown in FIG. 2 displays a printer registration screen HG1 shown in FIG. 4 on the display screen of the display device 23b. The image display portion 336 shown in FIG. 3 displays a printer registration screen HG2 shown in FIG. 6 on the display screen of the display device 33b.

The data input portions 23M and 338 processes data inputted by an administrator of the print server 23 and a user of the terminal device 33, respectively.

[Setting of the Printer PT in the Print Server 23]

FIG. 4 is a diagram showing an example of the printer registration screen HG1 in the print server 23.

As shown in FIG. 4, the printer registration screen HG1 includes an input window WN1, a list window WN2, a registration button BN1, a delete button BN2 and an edit button BN3, which are displayed on the display screen of the display device 23b.

The input window WN1 is used for adding a new printer PT to the printer information managing portion 235, or for editing printer information PTJ of the registered printer PT. The list window WN2 displays a list of printers PT registered in the printer information managing portion 235. The administrator edits the printer information PTJ on the printer registration screen HG1.

The printer information PTJ includes a printer name FLD1, a protocol to be used FLD2, an output target FLD3, a manufacturer FLD4, a device type FLD5, a version FLD6, and a place to be installed FLD7.

The printer name FLD1 is used so that the administrator or the user can discriminate each printer PT easily even if plural printers PT of the same type are included in the LAN 2. The protocol to be used FLD2 indicates a type of a communication protocol or commands used in the data transmission and reception between the print server 23 and the printer PT. The output target FLD3 indicates an address of the printer PT. The manufacturer FLD4 indicates a company name and others of the manufacturer of the printer PT. The device type FLD5 indicates a type or name of the printer PT. The version FLD6 indicates an identification number that is added along with revision of hardware or software of the printer PT. The place to be installed FLD7 indicates a place where the printer PT is installed or connection form.

With reference to FIG. 2, the printer information managing portion 235 acquires necessary information from the printer information memory portion PT4 and edits or deletes a registration of printer information PTJ of a new printer PT or a registered printer PT, so as to manage the printer information PTJ of each printer PT belonging to the LAN 2.

The printer information memory portion PT4 memorizes and manages the protocol to be used FLD2 of the printer PT, the output target FLD3, the manufacturer FLD4, the device type FLD5 or the version FLD6, and printer operation information PKJ about the operational state of the printer PT. Such information is managed as a database having a MIB (Management Information Base) format. Then, the printer information memory portion PT4 extracts necessary information responding to a request from the printer information managing portion 235 or the printer monitoring portion 234 that will be explained later, so as to transmit the information to the printer information managing portion 235 or the printer monitoring portion 234.

In this operation, the SNMP that is an upper protocol of the TCP/IP is used as a communication protocol.

Hereinafter, a registration process for a new printer PT will be explained with reference to a flowchart.

Figure 5:
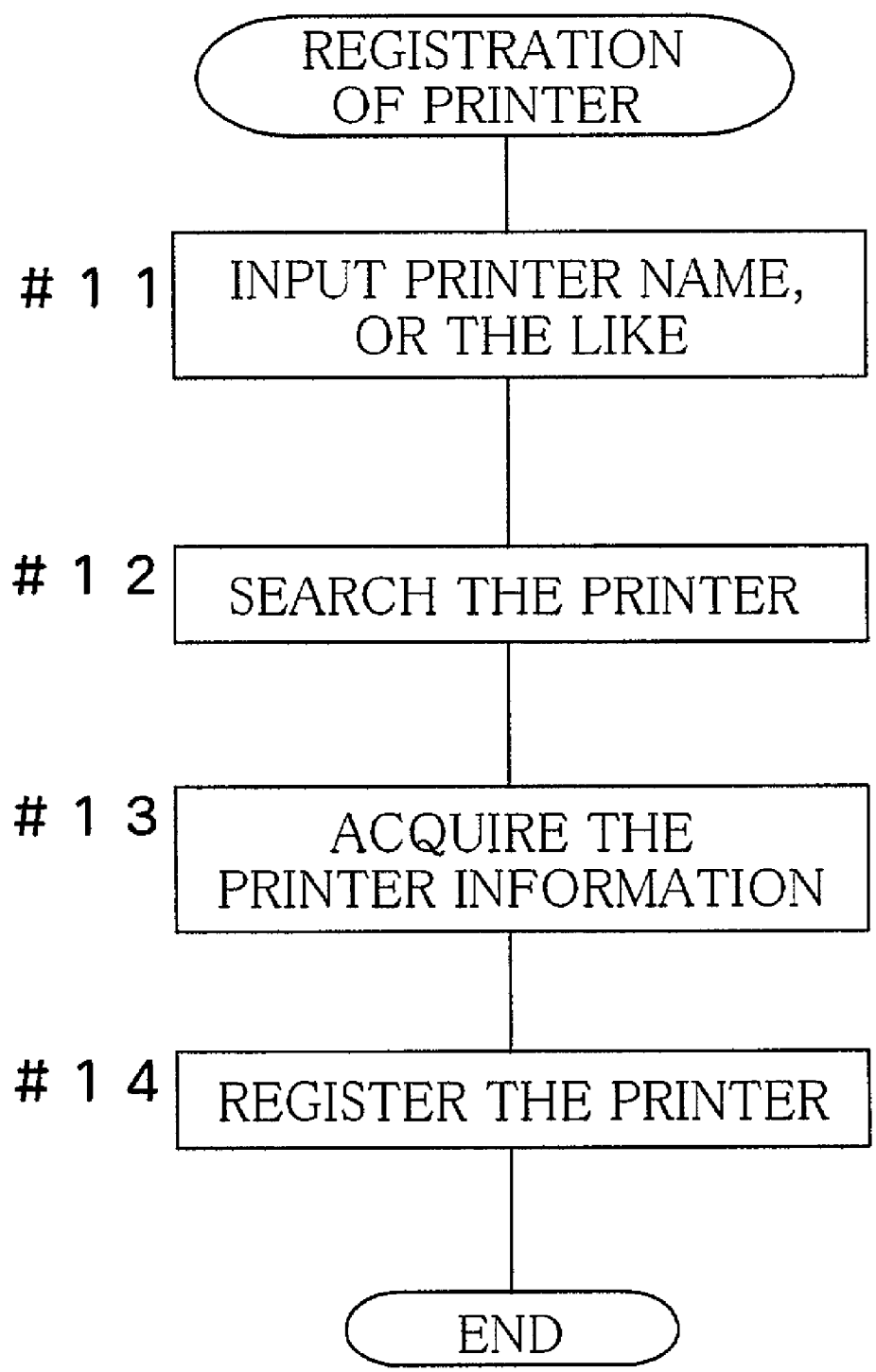
FIG. 5 is a flowchart for explaining a process of registering a new printer in a printer information managing portion.

FIG. 5 is a flowchart for explaining a process of registering a new printer PT in the printer information managing portion 235.

As shown in FIG. 5, the administrator inputs the printer name FLD1, the protocol to be used FLD2, the output target FLD3 and the place to be installed FLD7 of a printer PT to be added in the input window WN1 shown in FIG. 4 (#11). The printer information managing portion 235 searches a printer PT corresponding to the inputted information (#12) and acquires the manufacturer FLD4, the device type FLD5 and the version FLD6 of the printer PT from the printer information memory portion PT4 (#13).

When the administrator clicks the registration button BN1, the printer information PTJ of the new printer PT is registered in the printer information managing portion 235 (#14).

When editing the printer information PTJ of the registered printer PT, the printer name of the printer PT is selected in the list window WN2 before the Step #11, and then the edit button BN3 is clicked. Thus, the current printer information PTJ is displayed in the input window WN1. After that, the steps after Step #11 are performed.

For deleting the registration of a printer PT, the printer PT is selected in the list window WN2, and delete button BN2 is clicked.

[Registration of the Printer PT in the Terminal Device 33]

With reference to FIGS. 2 and 3, the hypertext generating portion 236 generates the hypertext HT1 in accordance with the printer information PTJ. The hypertext HT1 is described in a language such as HTML, and contents thereof are displayed by a software program such as a WWW browser.

The printer registration portion 335 acquires printer information PTJ of the printer PT from the print server 23 and registers the printer PT that can be used by the terminal device 33. The HTTP is used for acquiring the hypertext HT1, which is transmitted to the terminal device 33 without being restricted by the firewalls 22 and 32. The user designates a printer PT to be used among printers PT that are registered in the printer registration portion 335.

Figure 7:
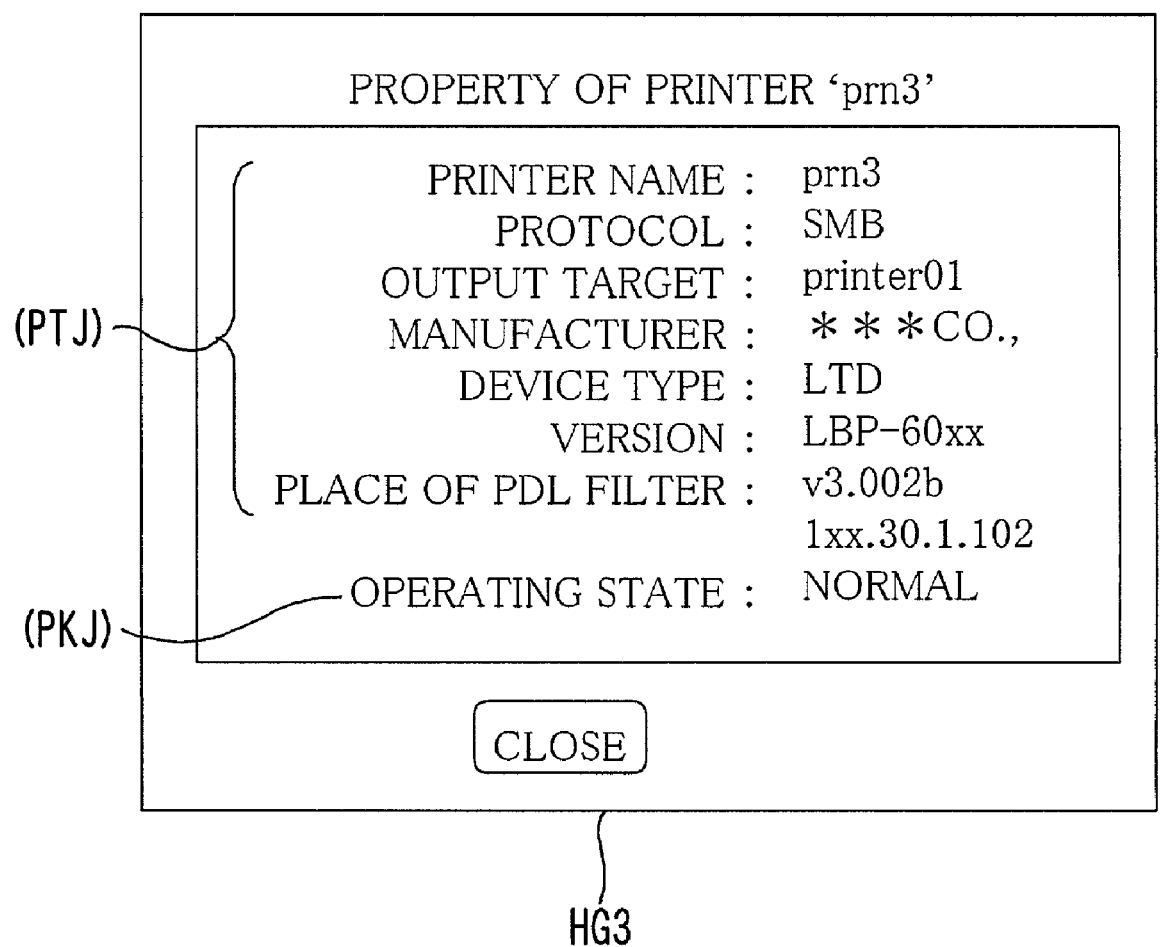
FIG. 7 is a diagram showing an example of a property screen of the printer.

FIG. 6 is a diagram showing an example of the printer registration screen HG2 in the terminal device 33. FIG. 7 is a diagram showing an example of a property screen HG3 of the printer PT.

As shown in FIG. 6, the printer registration screen HG2 includes a list window WN3, an input window WN4, a registration button BN4 and a property button BN5. The printer registration screen HG2 can be displayed on the display screen of the display device 33b.

The list window WN3 displays a list of printers belonging to other networks 11 including the LAN 2. The input window WN4 is used for registering a printer PT that can be used by the terminal device 33 in the terminal device 33. The address FLD8 indicates a URL of a file of a CGI program that is used by the HTTP data acquiring portion 231. The HTTP data acquiring portion 231 and the CGI program will be explained later.

When registering a printer PT in the printer registration portion 335, the URL of the CGI program file, e.g., "yyyyy.com/print.cgi" is inputted as the address FLD8 in the input window WN4, and the registration button BN4 is clicked.

When the property button BN5 is clicked, the printer information PTJ and the printer operation information PKJ of the printer PT are displayed as the property screen HG3 shown in FIG. 7. The user can confirm the information or the operational state of the printer PT while viewing the property screen HG3.

[Print Process]

Figure 8:
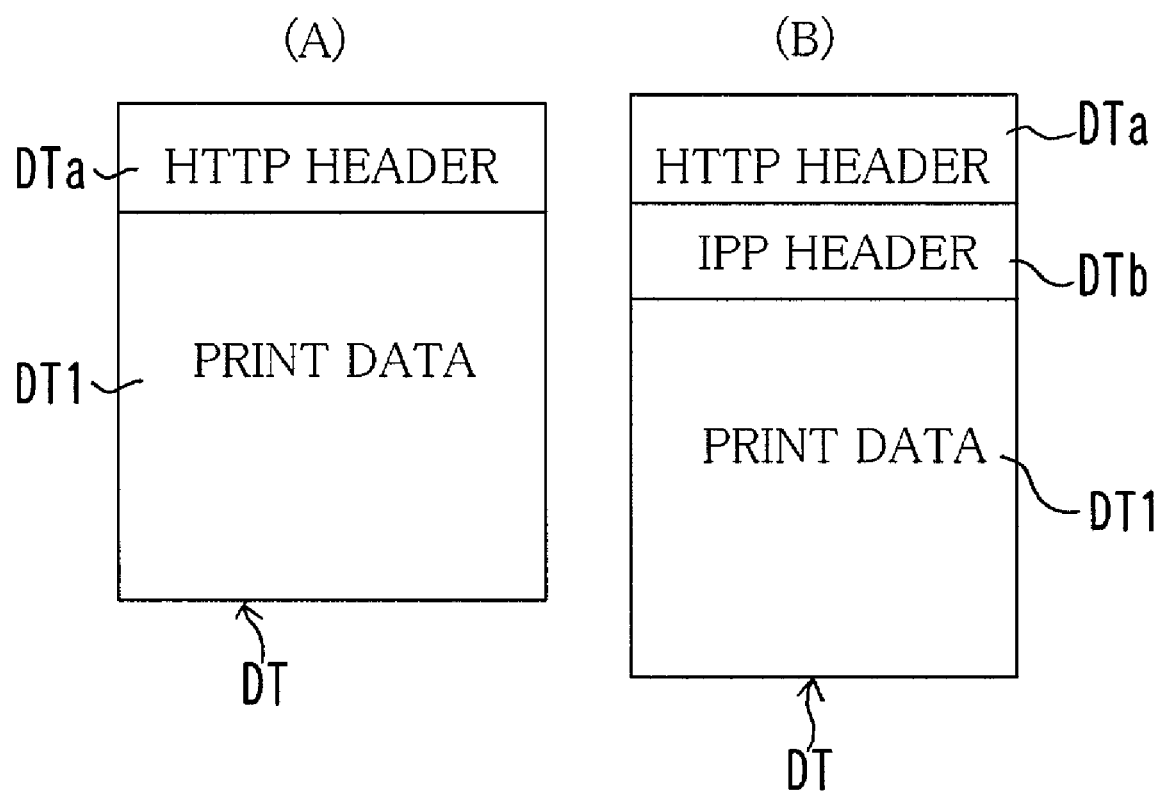
FIGS. 8A and 8B are diagrams for explaining a structure of HTTP data.

FIGS. 8A and 8B are diagrams for explaining a structure of the HTTP data DT.

With reference to FIGS. 2 and 3, the PDL converting portion 332 converts the print data DT1 to be printed that were made by using an application software into a PDL file corresponding to the printer PT as an output target device. The PDL converting portion 233 works in the same way.

Either the PDL converting portions 332 or 233 performs the conversion into the PDL file. In general, a file size of a binary file made by an application software is smaller than that of the PDL file. Therefore, in order to reduce traffic of the communication line 12 so as to shorten a communication period, it is desirable to make the print data DT1 a binary file to be transmitted to the print server 23, which converts the binary file to the PDL file. In this case, however, the print server 23 must have a software program that can read the binary file, and the load of CPU of the print server 23 becomes large due to the conversion into the PDL file. Therefore, it is decided which of the PDL converting portions 332 and 233 converts the print data DT1 into the PDL file in accordance with the print server 23 and the operational environment of the LAN 2.

The HTTP data generating portion 333 generates the HTTP data DT by adding a header DTa to the print data DT1 as shown in FIG. 8A. The header DTa includes information about the address of the printer PT to be used for printing. In addition, when using IPP (Internet Printing Protocol) that is an upper protocol of the HTTP, a header DTb about the IPP can be added as shown in FIG. 8B.

The HTTP data acquiring portion 231 receives the HTTP data DT via CGI. In order realize the CGI, a CGI program written in a language such as Perl, C or C++.

The CGI program is activated when the terminal device 33 designates it in such a manner as "yyyyy.com/print.cgi". The code "print.cgi" indicates a program that demands the HTTP data DT from the terminal device 33, acquires the HTTP data DT and information about the address of the printer PT as an output target from the terminal device 33 and transmits the print data DT1 to the printer PT.

The print data extracting portion 232 remove the header DTa from the HTTP data DT to extract the print data DT1. If the print data DT1 are already converted into the PDL file, the print data DT1 are transmitted to the print job control portion 238. If not converted, the PDL converting portion 233 converts the print data DT1 into the PDL file before the transmission.

The print job control portion 238 is provided for each printer PT. The print job control portion 238 memorizes the print data DT1 as a print job in a spool, so as to control the print jobs. For example, if there are plural print jobs, it is decided which print job should be transmitted to the printer PT first, and the completed print job is deleted. If UNIX is used for the operating system of the print server 23, "LPC" command is used.

In the same way, the computer 24 controls print jobs of the printer 2R that is connected to the computer body 24a via the print job control portion 242.

The printing portion PT3 outputs the print data DT1 in the form of printed sheets of paper, transmits information such as finish of output or errors to the printer monitoring portion 234, and check the operational state of the printer PT so as to generate the printer operation information PKJ.

The printer monitoring portion 234 acquires the printer operation information PKJ of the printer PT and monitors the operational state of the printer PT.

The hypertext generating portion 237 generates the hypertext HT2 in accordance with the printer operation information PKJ. When the print job is completed, the hypertext generating portion 237 generates hypertext HT2 in accordance with the printer operation information PKJ indicating the print result of the printer PT, so as to transmit the hypertext HT2 to the terminal device 33.

Next, a printing process in this example will be explained with reference to a flowchart.

Figure 9:
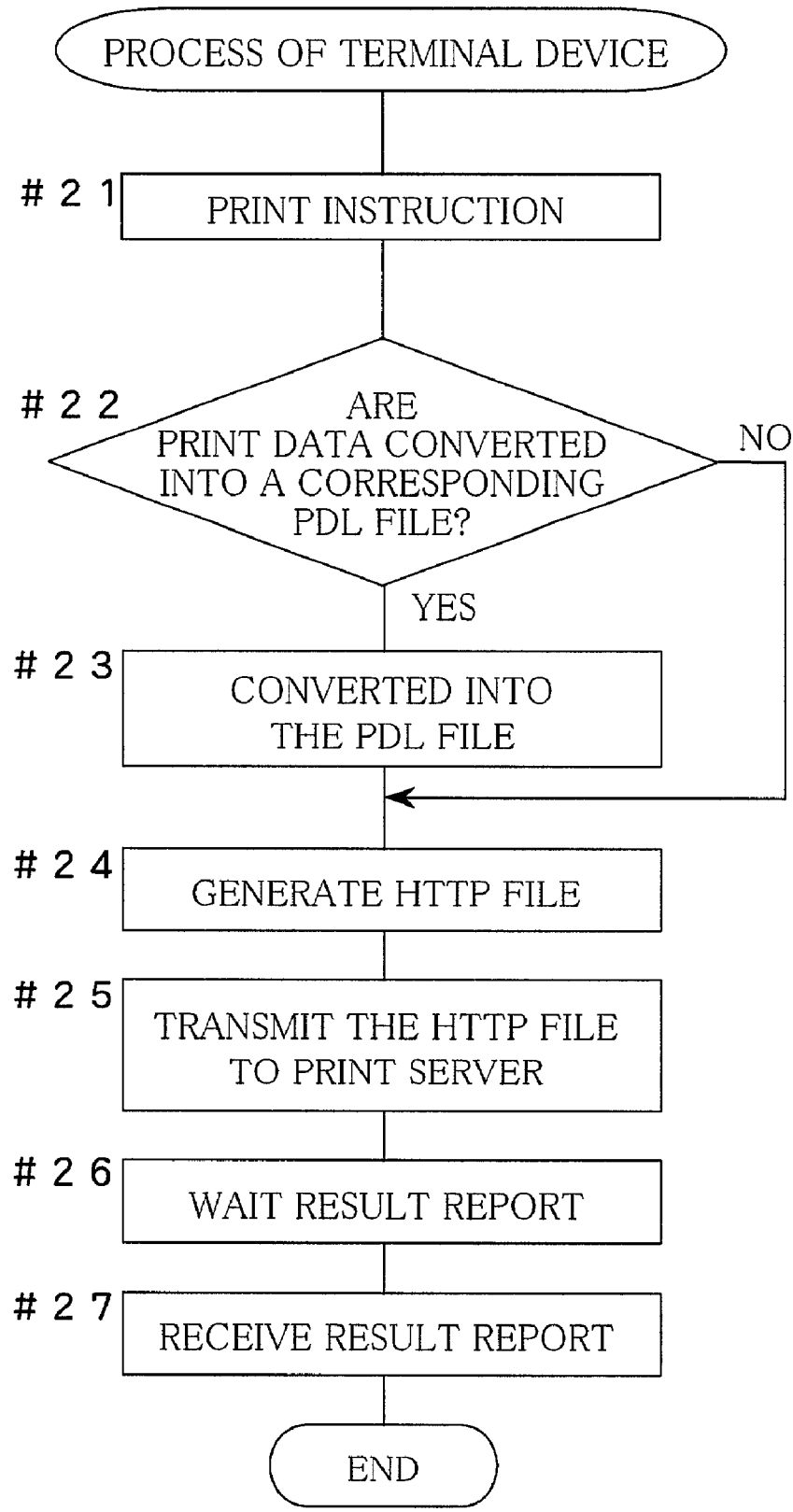
FIG. 9 is a flowchart for explaining the printing process in the terminal device.
Figure 11:
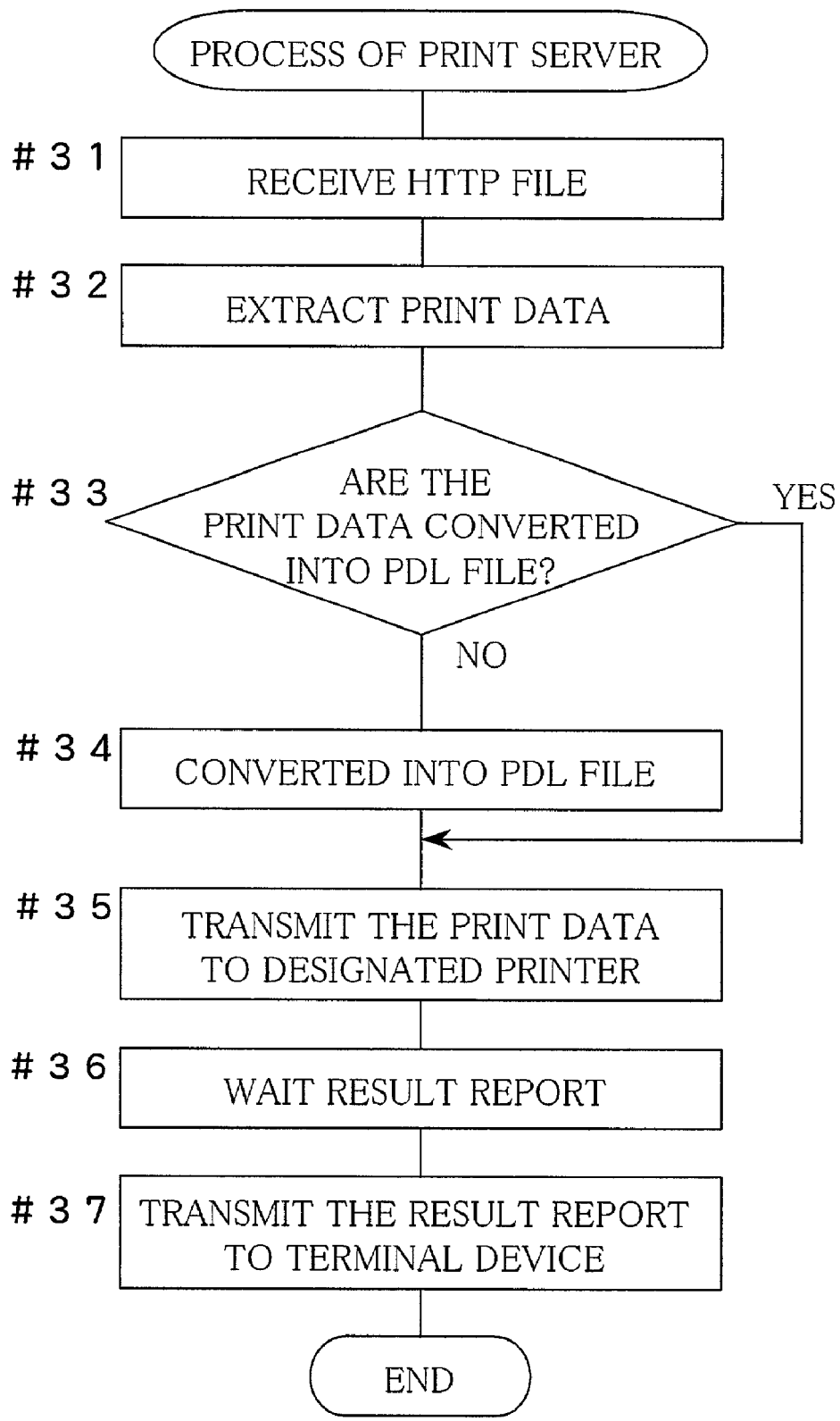
FIG. 11 is a flowchart for explaining the printing process in the print server.

FIG. 9 is a flowchart for explaining the printing process in the terminal device 33. FIG. 10 is a diagram showing an example of a result report screen HG4. FIG. 11 is a flowchart for explaining the printing process in the print server 23.

As shown in FIG. 9, a user of the terminal device 33 designates print data DT1 to be used and a printer PT to be used, so as to instruct the printing (#21).

If the print data DT1 should be converted to a PDL file corresponding to the printer PT (Yes in #22), the print data DT1 is converted to the PDL file (#23).

A header DTa is added to the print data DT1 so as to generate HTTP data DT (#24). The HTTP data DT are transmitted to the print server 23 (#25), and the result report from the print server 23 is waited (#26). If the printing is completed normally, the result report screen HG4 is displayed by the display device 33b as shown in FIG. 10 (#27).

As shown in FIG. 11, the print server 23 receives the HTTP data DT from the terminal device 33 (#31) and removes the header DTa from the HTTP data DT so as to extract the print data DT1 (#32).

If the print data DT1 are not converted to the PDL file in the terminal device 33 (No in #33), it is converted to the PDL file here (#34).

When the printer PT to be used becomes a job-waiting state, the print data DT1 are transmitted to the printer PT (#35). If the printer PT to be used is the printer 2P, the print data DT1 are transmitted to the printer PT via the communication line 25. If the printer PT to be used is the printer 2Q, the print data DT1 are transmitted to the printer PT via the input and output interface. If the printer PT to be used is the printer 2R, the print data DT1 are transmitted to the printer PT via the computer 24.

When the printer operation information PKJ about the print result is received from the printer PT (#36), the printer operation information PKJ is converted into the hypertext HT2, which is transmitted to the terminal device 33 (#37).

According to this embodiment, print data DT1, which could not pass through the firewall in the conventional structure, is hardly affected by the firewall by transmitting the print data DT1 using the HTTP as a communication protocol. Thus, the terminal device belonging to the LAN 3 can use the printer PT belonging to the LAN 2 on the Internet 1.

The print server 23 uses a CGI program for receiving print data DT1 and converts the result of print or information about the printer PT into a hypertext, which is transmitted to the terminal device 33. Therefore, a software program for a WWW server, a software program for a print server or other software programs such as a Web browser can be used for designing the system.

In this embodiment, the result of the printing process is transmitted from the print server 23 to the terminal device 33 using the hypertext HT2. However, the electronic mail can be used instead.

As the method for transmitting the print data DT from the terminal device 33 to the print server 23, a WWW browser of a terminal device can be used while designating a URL of the CGI program and a file name of the print data DT1 in such a way as "yyyyy.com/print.cgi?=abc.txt".

Figure 12:
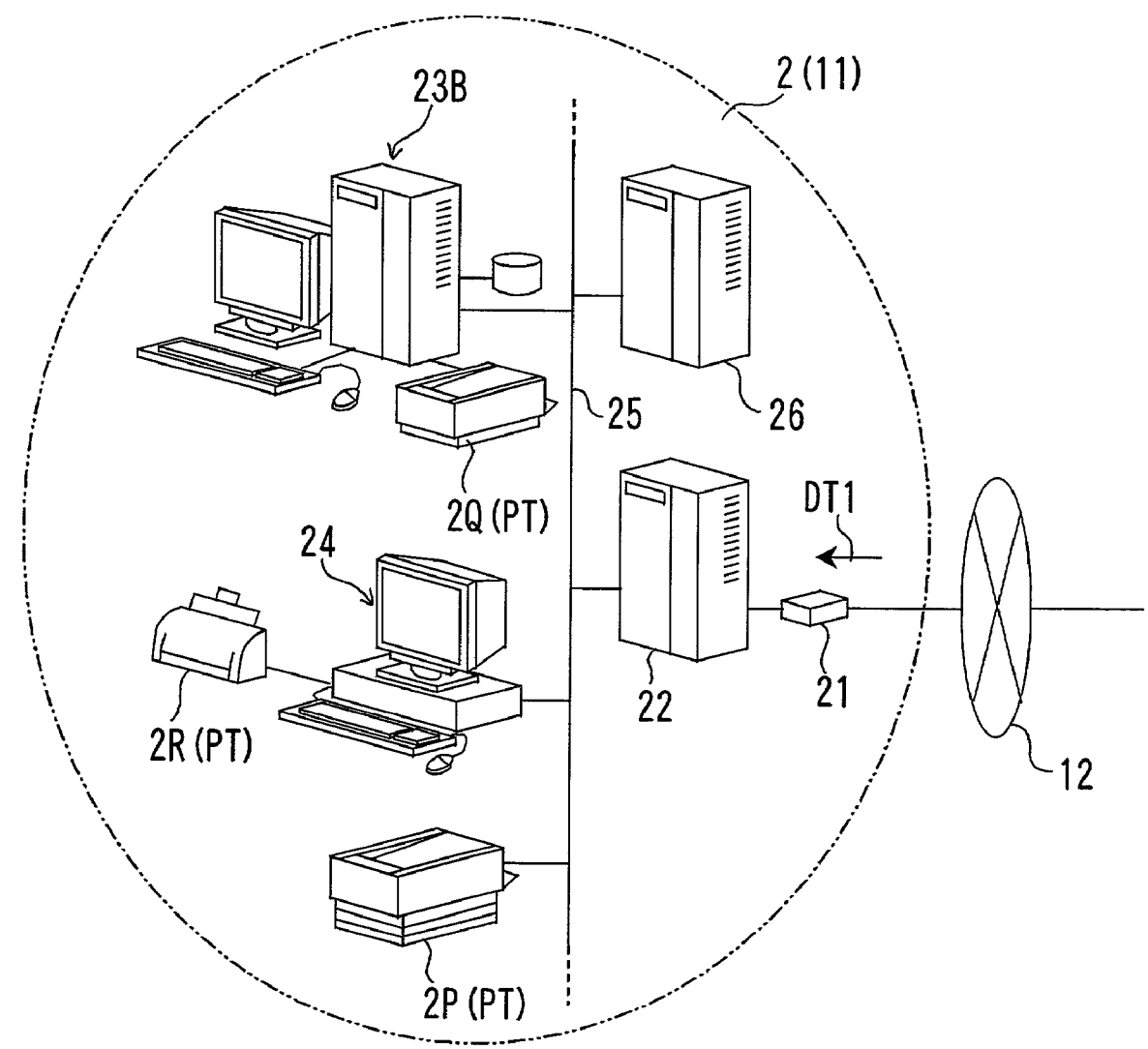
FIG. 12 is a diagram for explaining the structure of the LAN in another form.

It is possible to provide a HTTP server for receiving the print data DT1 aside from the above-mentioned print server 23, so that the LAN 2 is structured as shown in FIG. 12. Namely, a part of the functions of the above-mentioned print server 23 can be realized by the HTTP server 26.

Figure 13:
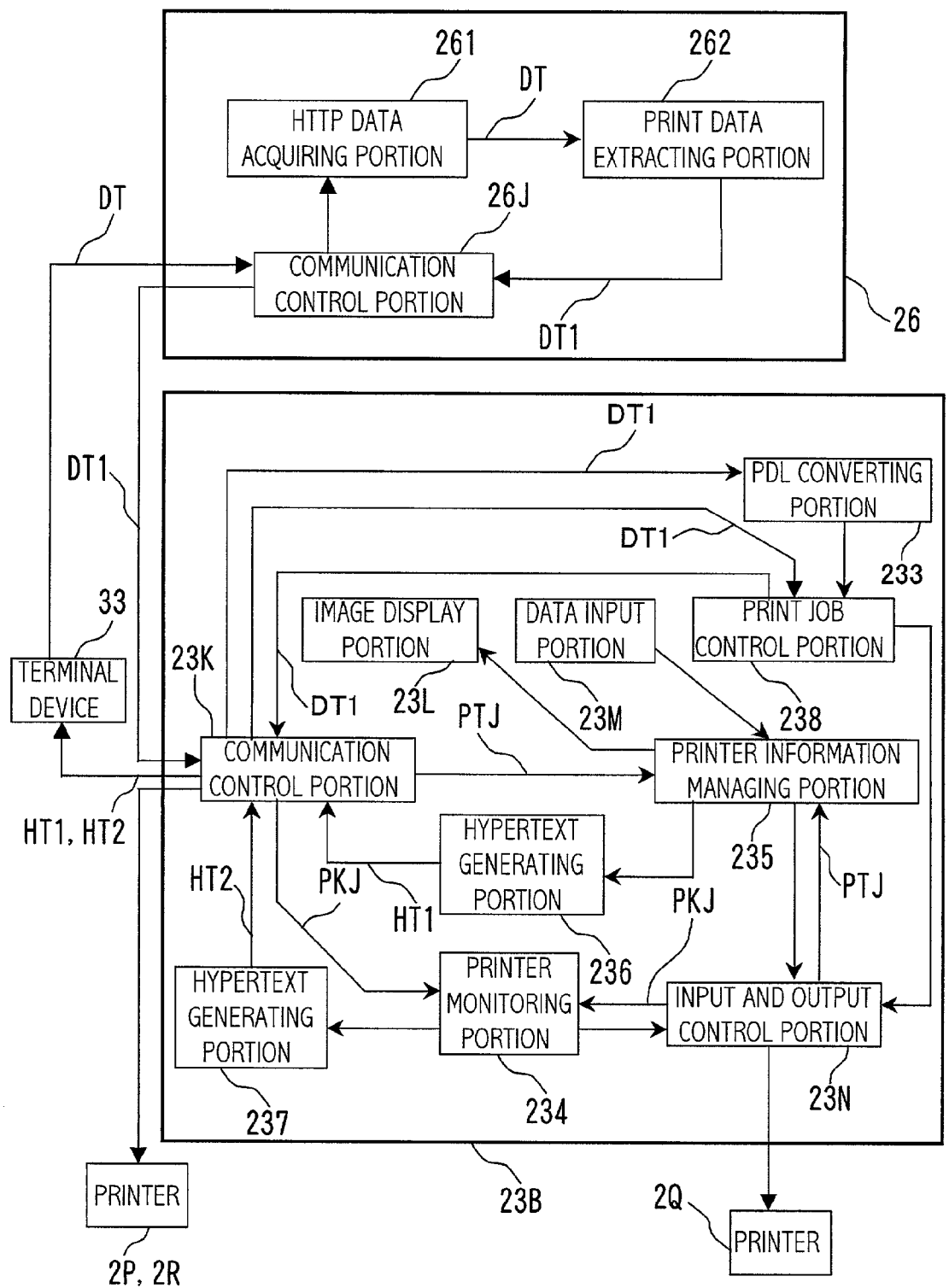
FIG. 13 is a diagram for explaining a functional structure of the print server and the HTTP server.

FIG. 12 is a diagram for explaining the structure of the LAN 2 in another form. FIG. 13 is a diagram for explaining a functional structure of a print server 23B and the HTTP server 26.

As shown in FIG. 12, the LAN 2 is provided with a HTTP server 26 for receiving data using HTTP as a communication protocol.

The print server 23B manages the printer, memorizes printer information for each printer, generates a hypertext describing the printer information, and transmits the hypertext to a client. The hardware structure of the print server 23B is the same as the print server 23. Other structure of the LAN 2 is the same as in the above-mentioned embodiment.

By this structure, the print server 23B and the HTTP server 26 can realize the functions as shown in FIG. 13.

As shown in FIG. 13, the print server 23B has the same functions as the print server 23 shown in FIG. 2 except the HTTP data acquiring portion 231 and the print data extracting portion 232, which are removed in the print server 23B. The HTTP server 26 has functional portions including a HTTP data acquiring portion 261, a print data extracting portion 262 and a communication control portion 26J.

The communication control portion 26J receives the HTTP data DT from the terminal device and transmits the print data DT1 to the print server 23B. The HTTP data acquiring portion 261 and the print data extracting portion 262 are the same as the HTTP data acquiring portion 231 and the print data extracting portion 232 shown in FIG. 2, respectively.

Namely, the print server 23 receives the HTTP data DT from the terminal device 33 in the embodiment explained with reference to FIG. 2, while the HTTP server 26 receives the HTTP data DT in the embodiment shown in FIGS. 12 and 13. Then, the print data DT1 are extracted from the received HTTP data DT, and the print data DT1 are transmitted to the printer designated by the HTTP header DTa of the print data DT1.

As the example shown in FIGS. 12 and 13, the load of the print server 23B can be reduced by providing the print server 23B and the HTTP server 26 separately, so that the entire system can be operated stably.

In this embodiment, an example is shown in which a CGI program that is a program for executing the print control method of the present invention is recorded in the magnetic disk drive 23h. Instead, the CGI program can be recorded in a semiconductor memory such as a RAM or ROM or a portable media ST1-ST4 such as a CD-ROM, a floppy disk, a memory card or a magneto-optical disk. If the recording medium is the portable media, the CGI program is read out by a drive device corresponding to the type of the portable media, is stored in the magnetic disk drive, or is loaded in a main memory to be executed.

The structure, process contents or a process order of the whole or a part of the LAN 2, the LAN 3, the print servers 23 and 23B, the HTTP server 26 or the terminal device 33 can be modified within the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A print server for managing a printer in a network environment, the printer server comprising:

a HTTP receiving unit that receives print data using HTTP as a communication protocol;

a print data transmitting unit that transmits the print data to a printer as an output target in accordance with a HTTP header of the print data;

a PDL converting unit that judges whether the print data is an appropriate PDL file for printing in the printer, and converts the print data into the appropriate PDL file corresponding to the printer when the print data is not the appropriate PDL file for printing in the printer;
a printer monitor that monitors a state of the printer;
a printer information managing unit that manages printer information such as an address of the printer, a type of a device or the communication protocol, or a name of the printer;
a printer information memorizing unit that memorizes the printer information for each printer;
a first hypertext generating unit that generates a hypertext describing the state of the printer; and
a second hypertext generating unit that generates a hypertext describing the printer information, wherein the print data transmitting unit removes the header of the print data before transmitting the print data to the printer.

2. A print control method for transmitting print data from a client to a print server managing a printer to print by the printer in a network environment, the method comprising:

using HTTP as a communication protocol between the client and the print server;
in the client, adding a header including information about the printer to be used to the print data so as to transmit the print data;
in the print server, receiving the print data and transmitting the print data to the printer in accordance with the header of the print data;
in the printer, printing the print data;
in the print server, converting a result of the printing or information about the printer into a hypertext and transmitting the result or the information to the client;
generating a hypertext describing printer registration information in the printer server; and
registering the printer in a terminal device of the client according to the generated printer registration information.

* * * * *

UNITED STATES PATENT AND TRADEMARK OFFICE
CERTIFICATE OF CORRECTION

PATENT NO. : 7,283,263 B2 Page 1 of 1
APPLICATION NO. : 09/828841
DATED : October 16, 2007
INVENTOR(S) : Takayuki Sugiura et al.

It is certified that error appears in the above-identified patent and that said Letters Patent is hereby corrected as shown below:

On the title page Item [56] Page 1, Column 2 (Foreign Patent Documents), Line 3, delete "DE     19922118 A1    11/2000". (Inadvertent duplication)

Signed and Sealed this

Thirteenth Day of May, 2008

JON W. DUDAS
*Director of the United States Patent and Trademark Office*